May 25, 1965     F. L. LAWRENCE     3,184,848
STATIC CORRECTION PLOTTER
Filed Oct. 17, 1961     2 Sheets-Sheet 1
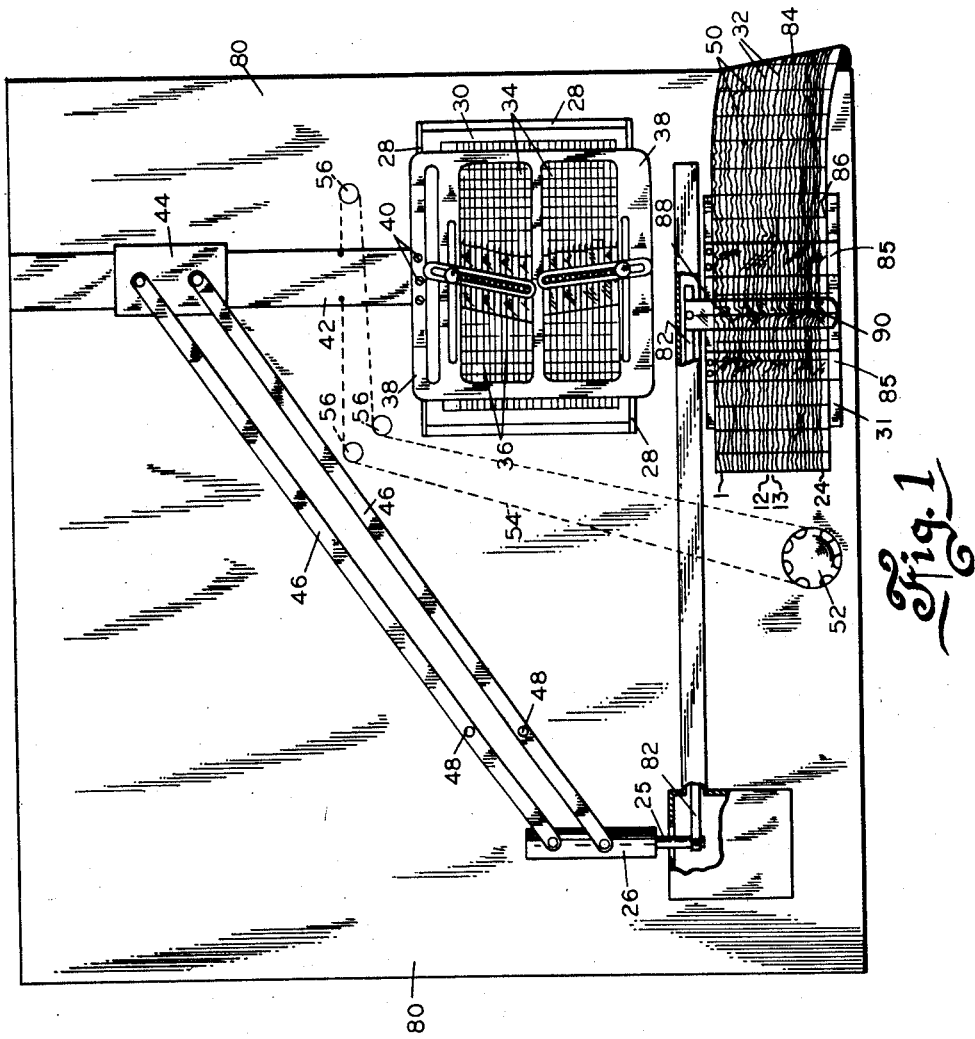
INVENTOR.
FRANKLIN L. LAWRENCE
BY
ATTORNEY May 25, 1965 F. L. LAWRENCE 3,184,848
STATIC CORRECTION PLOTTER
Filed Oct. 17, 1961 2 Sheets-Sheet 2
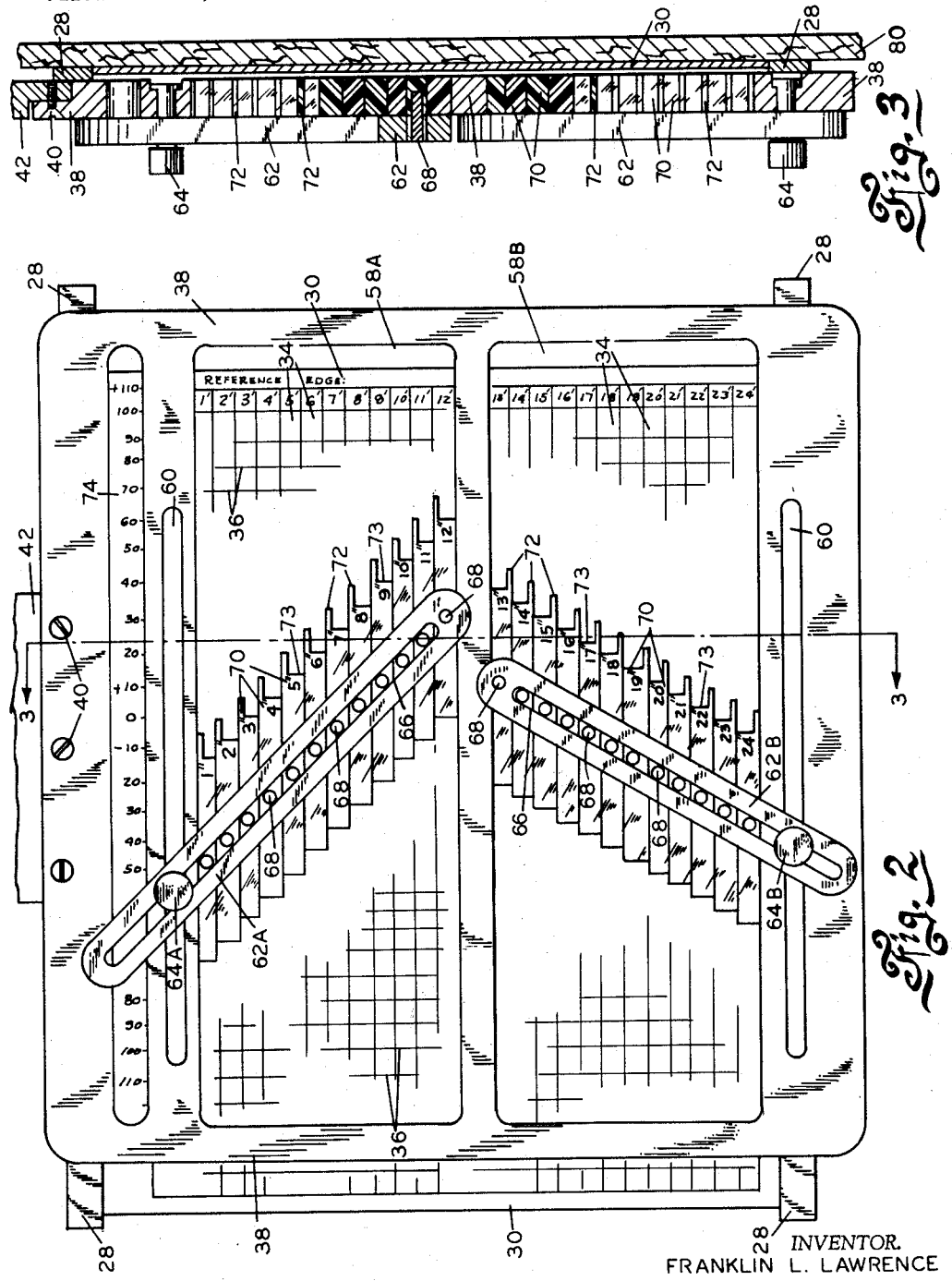
INVENTOR.
FRANKLIN L. LAWRENCE
BY James A. Reilly
ATTORNEY _United States Patent Office_  3,184,848
Patented May 25, 1965

3,184,848
STATIC CORRECTION PLOTTER
Franklin L. Lawrence, Tulsa, Okla., assignor, by mesne assignments, to Esso Production Research Company
Filed Oct. 17, 1961, Ser. No. 145,708
8 Claims. (Cl. 33—1)

This invention relates to a static correction plotter. More particularly, the invention relates to a device adaptable for transferring trace straightening corrections directly from a graphic seismograph record to a static correction card used for automatically programing the corrections into magnetic tape play-back machines and other type of electronic interpretative devices.

Seismic prospecting is a well known and universally used method of determining the most likely geographical areas for finding underground formations containing oil and gas. In seismic prospecting a seismic source or acoustic wave generator imparts an acoustic wave into the earth at a shot point. The seismic source is usually a dynamite charge that is ignited at a distance below the earth's surface and propagates acoustic waves outwardly and downwardly from the shot point. When a layer of earth is encountered having a different velocity of wave travel, reflection of a portion of the seismic wave occurs so that at each strata of different velocity material in the earth part of the seismic energy is reflected back to the surface.

The reflected seismic energy is detected by a series of geophones which are positioned along the surface of the ground in proximity to the shot point. The reflected energy physically moves the geophones and each geophone converts the physical movement into an electrical signal which is amplified and recorded. The recorded electrical signal from each geophone is termed a "trace." The recording of the detected reflected seismic signals may be made in several ways. Formerly it was a custom in the industry to record the reflected signals photographically, but at the present time the most commonly used system is that of electro-magnetic recording.

In order to utilize the recorded information of the reflected seismic signals to determine the attitude of the sub-strata formations which may lie several thousand feet beneath the earth's surface, the time measurements between the reflected signals must be carefully determined. It has been learned that the weathered layer constituting the actual surface of the earth varies widely in its seismic velocity. The layer may be a few feet to several hundred feet thick. Because of this, geophones, which are only a few feet apart, may experience time-phase shifts which must be eliminated in order that a true picture of the substrata formations be obtained. In addition, the earth's surface where the geophones are placed may not be level so that the geophones are at different elevations. Unless time-phase corrections are made for the difference in elevation of the geophones, an erroneous indication of the attitude of the substrata formations may be given. Correcting the time-phase relationship between the recorded seismic signals from a single blast due to the effect of the earth's weathered layer and due to the difference in elevation of the geophones is termed "static correction."

In past seismic record processing the static correction of the recorded signals to eliminate discrepancies due to the surface weathered formations and other factors has been primarily a mathematical procedure wherein the corrections are calculated and applied to each trace. Under present processes of seismic prospecting the reflected seismic signals are magnetically recorded without filtering. Simultaneously with the magnetic recording, the usual procedure is to also record the signals graphically on a high quality paper by means of an actuated ink pen stylus. The magnetic records are taken to a central laboratory where they may be played back repeatedly under various filter and mixing operations to produce records giving greatly improved information. In many cases, the information from the magnetic tapes is fed into computing machines into which the static corrections applicable to each trace are programmed. Static corrections are usually introduced into such machines in the form of marks made with electro-magnetic lead pencils on static correction cards. The spaced relationship between the marks on the correction card are utilized within the computing machines to electronically make the necessary static corrections for each trace and properly align it in relation to other traces for the production of useful records.

Under present practices, the static correction must be computed for each trace and manually inserted onto the correction card. In the typical seismic prospecting recording systems in use today there are ordinarily two pairs of twelve traces each. This means that each correction card must be marked with twenty-four separate computed bits of correction. The arithmetical calculations of the correction required and the clerical duty of placing the computed correction on the correction card can result in errors and is time consuming.

It is therefore an object of this invention to provide a static correction plotter adaptable for directly transferring static corrections from a graphic seismic record onto a static correction card.

Another object of this invention is to provide a static correction plotter adaptable for transferring static corrections from graphic seismograph records directly onto static correction cards which eliminates the mathematical calculation of the amount of correction required for each trace.

Another object of this invention is to provide a static correction plotter adaptable for transferring static corrections from a graphic seismic record to a static correction card which will substantially eliminate the possibility of error in the transfer of the corrections to the correction card.

These and other objects and a better understanding of the invention may be had by referring to the following description and claims taken in conjunction with the attached drawings, in which:

FIGURE 1 is a top elevational view of the static correction plotter of this invention.

FIGURE 2 is an enlarged top view of the carriage member of the invention.

FIGURE 3 is a cross-sectional view taken along the line 3—3 of the carriage member of FIGURE 2.

Briefly, and not by way of limitation, this invention may be described as a static correction plotter for use in marking time-phase corrections on a static correction card from a graphic seismic record. The plotter is mounted upon a desk or table for operation and includes a holder for the seismic record. An indicator member having a line reference is positioned laterally to the record and movable, between limits, longitudinally to the record. A holder is adapted to receive and support the static correction card in a fixed position. A pivotal trace slope adjustment arm is positioned contiguous over the correction card and includes a multiplicity of marking edges for each trace of the seismic record. Mechanical linkage is provided to produce relative motion of the indicator member and the slope adjustment arm.

Referring now to the drawings and first to FIGURE 1, the static correction plotter of this invention is shown. The device is shown mounted on a baseboard 80 which may be supported horizontally, vertically or at an angle intermediate thereto for ease of operation. A seismic record holder 31 is supported on baseboard 80 and is adaptable to receive a graphic seismic record 84 which ordinarily is formed on an elongated strip of paper approximately four inches in width simultaneously with a magnetic record. Other times the paper record may be made in a play back or recording step from the magnetic record as described in U.S. Patent 2,986,722. Seismic record 84 is held against a straight edge 86 formed along the lower portion of the seismic record holder 31 so that a reference position is maintained. The record 84 is longitudinally movable to various reflection events on the record in the seismic record holder 31 by the operator. When the desired position is achieved, the record is held in position by holding members 85 which are transparent plastic members laterally affixed across the record to the record holder 31.

Extending laterally over seismic record 84 is a movable indicator member 88 having a line reference 90 formed thereon. In the embodiment shown the indicator member is of clear plastic material with reference line 90 etched in the lower surface thereof so that the reference line is maintained in close proximity to the seismic record 84. Indicator link 82 connects the indicator member 88 with a rod 25 which slidably extends within pantographic cylinder 26. Movement of cylinder 26 vertically and horizontally moves indicator link 82 horizontally only. Indicator link 82 supports the movable indicator member 88 so that the line reference 90 remains in a fixed attitude laterally across the width of seismic record 84 as the indicator member is moved relative to the seismic record.

In addition to the "static" or "smoothing" corrections which must be taken into account when seismic data is to be utilized in electronic computing devices, an additional type of correction may be required which is referred to as "move-out" or "spread" correction. This latter correction is made when comparing reflections from relatively shallow formations. The requirement for spread correction results from the variation in time that seismic energy takes to travel from a shot point down to a formation and back up to geophones which are placed at varying distances from the shot point. When reflections from deeper formations are compared, the effects of the difference in distance between the shot point and different geophones become negligible. Since most investigations of seismic records pertain to deeper formations, spread corrections are usually insignificant, in which case line reference 90 will be a straight line, as in FIGURE 1. When the shallower formations are studied, line reference 90 will be a curved line, the curve being a hyperbolic function according to the spread corrections. Various other line references 90 are utilized by merely replacing indicator member 88. Another embodiment, not shown in the drawings, but an obvious expedient, includes providing an indicator member 88 of a configuration adaptable to removably receive a multiplicity of different line references 90 formed on transparent members.

Supported to base 80 and positioned above the seismic record holder 31 is a static correction card holder 28 which receives and supports a static correction card 30. Static correction card 30 is used as a means of programming into electronic computing apparatus the corrected time-phase relationship of the individual traces 32 shown on the graphic seismic record 84. That is, traces are corrected for weathering of the earth's upper layer and differences in elevation of the geophones which cause variations in the reflection time of the seismic acoustical signal. In order to perform various experiments utilizing the recorded information it is necessary that the reproduced signals be shifted into alignment. Computing devices utilize information from the static correction card 30 for making such transpositions of the recorded signals by means of marks placed on the card with an electrographic pencil. The correction card 30 has formed thereon longitudinal correction columns 34 corresponding to each trace 32 on seismic record 84. Formed laterally on the static correction card 30 are time lines 36, likewise corresponding to the seismic record time.

Supported over the trace correction card holder 28 is a carriage 38. Extending from carriage 38, which may either be integrally formed therewith or affixed thereto, as with screws 40, is a carriage arm 42. Slidably positioned on carriage arm 42 is a carriage yoke 44 which connects through a pair of pantographic links 46 to pantographic cylinder 26. Pantographic links 46 are pivoted at points 48 near the pantographic cylinder 26 such that relative movement of indicator link 82 corresponds to the ratio of the distance between time lines 50 on seismic record 84 and the distance between time lines 36 on the static correction card 30.

A correction adjustment knob 52 is rotatably affixed to base 80 and is connected by flexible chain 54 and pulleys 56 to carriage arm 42. Rotation of the adjustment knob 52 causes carriage arm 42 to be moved back and forth, shifting the carriage 38 relative to static correction card 30. By means of the pantographic linkage 46, cylinder 26, rod 25 and indicator link 82, the line reference 90 is moved simultaneously with the movement of carriage 38.

The pantographic linkage 46 is exemplary of a movement coupling means extending from indicator member 88 to carriage 38. Other types of ratio coupling means are suggested, such as a rack and pinion gear arrangement.

The details of the arrangement of carriage 38 can best be seen in FIGURES 2 and 3. Carriage 38 has upper and lower slope bar openings 58A and 58B with corresponding sides parallel. The openings expose the underneath static correction card 30. Upper and lower slots 60 are provided adjacent the slope bar openings 58A and 58B to slidably support slope adjustment arms 62A and 62B, respectively. Clamp screws 64A and 64B are utilized as means of individually adjusting the slope of adjustment arms 62A and 62B. Each of the slope adjustment arms 62A and 62B has an elongated slot 66 formed therein to receive slope bar pins 68.

Slidably positioned in slope bar opening 58A in carriage 38 is a first group of slope bars 70, and in like manner slidably positioned in slope bar opening 58B is a second group of slope bars 70. A slope bar is provided for each trace 32 on seismic record 84, and thus one for each of the correction columns 34 on the static correction card 30. Slope bars 70 are formed of a clear plastic so that the markings on the static correction card 30 may be seen through the bars 70.

Integrally formed with and extending outwardly parallel to the length of each slope bar 70 is a lip portion 72. Each of the slope bars terminates in a surface perpendicular to their length, such surface forming a marking surface 73. The provision of lip portions 72 extending from the marking surface 73 of each slope bar 70 provides a marking boundary between successive slope bars 70 so that a pencil may be placed adjacent marking end 73 and with an upward and downward motion a mark will be formed on static correction card 30. Lips 72 prevent marking a wrong portion of the static correction card 30. Also the provision of lips 72 provides a means whereby successive lines may be placed on static correction card 30 without requiring the operator to remove his eyes from the seismic record 84.

An index slot 74 in carriage 38 exposes a printed time-phase index on static correction card 30.

As has been previously mentioned, the number of individual channels or traces of recorded information may vary considerably according to the type and extensiveness of the seismic equipment being used. Typically, most sismographic systems in use today include twenty-four recording channels or traces. Thus, there are twenty-four geophones feeding into twenty-four amplifiers and twenty-four traces of information are recorded as each seismic shot is exploded. To correct such records for automatic computation the static correction card 30 then will have twenty-four correction columns 34 and there will therefore be twenty-four slope bars 70. It can be seen that this arrangement may be varied considerably according to different geophysical prospecting systems. A typical prospecting system utilizes twelve geophones or twelve traces each side of the shot point so that there are two groups of traces of twelve each. Thus, the time-phase relationship of one group will be corrected by the slope of slope adjustment arm 62A and the other group by the slope of slope adjustment arm 62B.

Operation

Time-phase computations, made by observation and mathematics for trace 1 and trace 12 of traces noted generally by legend 32 of seismic record 84 and for traces 13 and 24 of traces noted generally by legend 32 of seismic record 84 are marked with an electrographic pencil in their proper correction columns 34 on the static correction card 30 before it is placed in the static correction card holder 28. Seismic record 84 is then inserted in the seismic record holder 31 under the movable indicator member 88. Ordinarily, the time-phase relations are computed by referring to prominent reflections as shown by traces 32 and particularly at the valleys, or peaks, of corresponding reflections. After seismic record 84 is placed in record holder 31, it is held in position by holding members 85. Line reference 90 is aligned with reflection valley of trace number 1 on the seismic record 84. The upper slope clamp screw 64A is loosened and slope adjustment arm 62A is moved so that the guide end 73 of the number one slope bar 70 aligns with the mark previously placed on the static correction card 30 for the computed time-phase mark in the number one correction column 34. Correction adjuster knob 52 is then turned until line reference 90 aligns with the reflection valley for trace 12 on the seismic record 84. With the number one slope bar 70 held in a fixed position, slope adjustment arm 62A is pivoted until guide end 73 of slope bar number twelve aligns with the number twelve computed correction mark on the static correction card 30. The computed corrections for traces number 1 and 12 have now been inserted into the mechanism and slope clamp screw 64A may be tightened.

The same procedure is followed in aligning traces 13 and 24.

To finish marking the static correction card 30 an electrographic pencil is used against the guide end 73 of traces 2 through 11 and in similar arrangement traces 14 through 23. To mark in the correction on static correction card 30 of trace number 2, correction adjustment knob 52 is rotated until line reference 90 aligns with the valley of trace number 2 on seismic record 84. When the alignment of trace number 2 is made on the seismic record 84, a mark is made at the guide end 73 of the number two slope bar 70. It can be seen that the provision of lip 72 permits the operator to mark the necessary electrographic marks on static correction card 30 without chance of error in the mark protruding beyond into the next adjacent correction column 34.

When number two trace column 34 has been properly marked to show the shift of this trace forwardly or rearwardly out of sequence with the corrected time-phase relationship of the other seismic traces, correction adjustment knob 52 is rotated to align line reference 90 with valley of trace number 3 and an electrographic mark is placed at the guide end of slope bar number three.

After the operator has used the mechanism of this invention for a short time, practice will enable him to follow the line reference 90, moving his pencil from one slope bar 70 to the next without taking his eyes off of line reference 90 and seismic record 84.

Static corrections are based on the assumption that the sub-strata formation reflecting seismic energy will be approximately a straight line relationship at the relatively short distances between geophones, and that therefore the reflected energy should arrive at the surface of the earth in substantially a straight line relationship. Thus, when the static correction is determined between traces 1 and 12, it is assumed that this will follow a straight line relationship which is accomplished by the maintaining of the slope adjustment arms 62A and 62B at constant angles by the tightening of slope clamp screws 64A and 64B. By the movement of correction adjustment knob 52 to align line reference 90 with the valleys of each successive peak, the carriage 38 is shifted back and forth so that the proper amount of time-phase correction to be fed into the computing machines is marked on static correction card 30. In this way, only the first and last computation must be made for each series of traces 32 and manually placed on the static correction card 30. The other corrections are placed thereon speedily, accurately and with greatly reduced chance of human error by the static correction plotter of this invention as compared to the slow and more demanding procedure of mathematically computing each of the time-phase shift amounts required and manually placing the required correction on the static correction card 30. This permits the static or smoothing corrections to be computed and transferred to the static correction card 30 in one step. Placing all the required corrections on a static correction card by the device of this invention requires less than one-half the time normally required by the manual method.

Although this invention has been described with a certain degree of particularity it manifests that many changes may be made in the details of construction and arrangement of components without departing from the spirit and scope of this disclosure.

What is claimed is:

1. A static correction plotter for use in marking time-phase corrections on a static correction card from a graphic seismic record, comprising, a seismic record holder for receiving and supporting said seismic record; a movable indicator member extending across said seismic record as said seismic record is supported by said seismic record holder; said indicator member having a line reference formed thereon; a static correction card holder for receiving and supporting said static correction card in a stationary position; a substantially non-flexible pivotably positionable slope adjustment arm movably supported over and adjacent said static correction card as said static correction card is supported by said static correction card holder; means supported by said slope adjustment arm providing a multiplicity of marking edges adjacent said static correction card; and movement coupling means extending from said indicator member to said slope adjustment arm.

2. A static correction plotter according to claim 1 wherein said movement coupling means extending from said indicator member to said slope adjustment arm includes pantographic coupling means.

3. A static correction plotter for use in marking time-phase corrections on a static correction card from a graphic seismic record, said seismic record having a multiplicity of visible traces formed thereon indicative of detected reflected seismic energy and said static correction card having a multiplicity of columns substantially parallel to each other thereon for marking the time-phase correction of each of said traces; comprising, a record holder adaptable to receive and support in a fixed position said seismic record; a movable indicator member extending laterally across said seismic record and movable longitudinally of seismic record between limits, said indicator member having a line reference formed thereon extending across said record; a static correction card holder adaptable to removably receive and support said static correction card in a fixed position relative to said seismic record holder; a carriage means movably supported adjacent and above said supported static correction card, said carriage means longitudinally movable in a plane parallel to said static correction card; at least one slope adjustment arm pivotably affixed to said carriage means, said slope adjustment arm extending parallel to and adjacent said supported static correction card; a group of slope bars arranged parallel to each other and to said columns of said static correction card, each of said slope bars having a substantially equal size rectangular cross-sectional configuration, each of said slope bars having a width substantially equal to the width of said parallel columns of said static correction card, and each of said slope bars having one end thereof forming a guide end substantially perpendicular to the length of said slope bars; means of individually pivotably supporting said slope bars to said slope adjustment arm whereby said guide end of each of said slope bars remains equidistant from said slope adjustment arm; means of releasably clamping said slope adjustment arm at varying angles relative to said carriage; and movement coupling means extending from said movable indicator member to said carriage means.

4. A static correction plotter according to claim 3 wherein said coupling means extending from said indicator member to said carriage means includes pantographic coupling means.

5. A static correction plotter according to claim 3 wherein said indicator member comprises an elongated relatively thin transparent member extending the width of said seismic monitor record, and wherein said line reference is a line formed on one surface of said transparent member.

6. A static correction plotter according to claim 3 wherein each of said slope bars at said guide end thereof has an integrally formed lip portion extending parallel to the length of said slope bar whereby marking boundaries are formed between each of said lip portions and an adjacent slope bar.

7. A static correction plotter according to claim 3 wherein said at least one slope adjustment arm includes a first and a second slope adjustment arm wherein each of said slope adjustment arms is independently pivotably affixed to said carriage means, wherein each of said slope adjustment arms extends parallel to and adjacent said supported static correction card, and including a first and a second group of slope bars arranged parallel to each other and to said parallel columns of said static correction card, said first group of slope bars individually pivotably supported to said first slope adjustment arm and said second group of slope bars individually pivotably supported to said second slope adjustment arm; and means of releasably clamping said slope adjustment arms at varying angles to said carriage whereby static corrections of two groups of traces on said graphic seismic record may be plotted on said static correction card.

8. A static correction plotter according to claim 3 wherein said carriage has a slope bar opening therein, the upper and lower sides of said opening being parallel to each other and to said parallel columns of said supported static correction card, said sides having a perpendicular distance therebetween substantially equal to the total width of said group of slope bars as said slope bars are positioned parallel and contiguous to each other, said opening receiving and slidably supporting said slope bars, and wherein said slope adjustment arm has an elongated parallel sided slot formed therein, said means of individually pivotably supporting said slope bars to said slope adjustment arm includes a cylindrical slope bar pin protruding substantially perpendicularly from the upper surface of each of said slope bars, the slope bar pin of each of said slope bars being an equal distance from the said guide end of each of said slope bars, said slope bar pins having a diameter substantially equal to the perpendicular distance between said parallel sides of said slot in said slope adjustment arm, said slot in said slope adjustment arm receiving and thereby individually pivotably supporting said slope bars to said slope adjustment arm.

References Cited by the Examiner

UNITED STATES PATENTS

| 2,686,633 | 8/54 | Hale | 33—1 X |
| 2,858,069 | 10/58 | Garvin et al. | |
| 2,864,167 | 12/58 | Hall | 33—1 |

ISAAC LISANN, *Primary Examiner.*